(12) United States Patent
Di et al.

(10) Patent No.: US 10,250,987 B2
(45) Date of Patent: Apr. 2, 2019

(54) CARBON FIBER DOME AND MANUFACTURING METHOD FOR SAME

(71) Applicant: AAC Technologies Pte. Ltd., Singapore (SG)

(72) Inventors: Xun Di, Shenzhen (CN); Bin Zhao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 5 days.

(21) Appl. No.: 15/646,884

(22) Filed: Jul. 11, 2017

(65) Prior Publication Data
US 2018/0302721 A1   Oct. 18, 2018

(30) Foreign Application Priority Data
Apr. 13, 2017  (CN) .......................... 2017 1 0237832

(51) Int. Cl.
| | |
|---|---|
| *H04R 7/12* | (2006.01) |
| *H04R 31/00* | (2006.01) |
| *B32B 37/14* | (2006.01) |
| *B32B 5/02* | (2006.01) |
| *C08J 5/24* | (2006.01) |

(52) U.S. Cl.
CPC .............. *H04R 7/127* (2013.01); *B32B 5/02* (2013.01); *B32B 37/14* (2013.01); *C08J 5/24* (2013.01); *H04R 31/003* (2013.01); *B32B 2305/076* (2013.01); *B32B 2307/10* (2013.01); *B32B 2309/105* (2013.01); *H04R 2307/023* (2013.01)

(58) Field of Classification Search
None
See application file for complete search history.

(56) References Cited

U.S. PATENT DOCUMENTS

| | | | | |
|---|---|---|---|---|
| 4,460,060 A | * | 7/1984 | Hasumi | H04R 7/02 181/169 |
| 4,659,624 A | * | 4/1987 | Yeager | B29C 70/086 428/408 |
| 5,283,027 A | * | 2/1994 | Sakamoto | B29C 51/002 264/320 |
| 2007/0286448 A1 | * | 12/2007 | Sato | H04R 7/125 381/424 |
| 2012/0106772 A1 | * | 5/2012 | Horigome | H04R 9/06 381/398 |
| 2015/0266260 A1 | * | 9/2015 | Fujioka | B32B 3/30 428/118 |

FOREIGN PATENT DOCUMENTS

JP   03-165698   *  7/1991  .............. H04R 7/00

* cited by examiner

*Primary Examiner* — David Sample
*Assistant Examiner* — Nicole T Gugliotta
(74) *Attorney, Agent, or Firm* — Na Xu; IPro, PLLC

(57) ABSTRACT

The present disclosure provides a carbon fiber dome. The carbon fiber dome includes at least two carbon fiber prepreg layers. The at least two carbon fiber prepreg layers include carbon fiber prepregs made by at least two weaving methods. In addition, the present disclosure provides a method for manufacturing the carbon fiber dome as described above. The method includes the following steps: using prepreg resin to pre-impregnate carbon fiber materials made by at least two weaving methods; and pre-impregnating the carbon fiber materials made by at least two weaving methods for bonding each other.

10 Claims, 3 Drawing Sheets

CARBON FIBER DOME AND MANUFACTURING METHOD FOR SAME

CROSS-REFERENCE TO RELATED APPLICATIONS

This application claims the priority benefit of Chinese Patent Application Ser. No. 201610398572.9 filed on Jun. 7, 2016, the entire content of which is incorporated herein by reference.

FIELD OF THE PRESENT DISCLOSURE

The present disclosure relates to electro-acoustic transducers, more particularly to a carbon fiber dome for radiating audible sounds.

DESCRIPTION OF RELATED ART

A loudspeaker generally includes a diaphragm for radiating sounds. The diaphragm typically includes a dome part and a suspension connecting with and supporting the dome. The dome part of the vibrating diaphragm is commonly made of an aluminum foil-foam material composite. With the development of the electronic industry, there are demands for higher performance and reliability of the electro-acoustic system and increasingly higher requirements for domes. The domes of aluminum foil-foam material composites can no longer meet user's needs due to such frequent problems as the aluminum foil splinters easily, the foam material is separated from the aluminum foil, and the materials have inadequate strength. From other aspect, the flexible aluminum foil, as the intuitive and visible part of products, are liable to contamination, scratching and other damages to appearance; the foam material is liable to deformation under stress and difficult to recover its original shape once deformed, and it has a strong water absorptivity, tending to cause the aluminum foil and the foam material to be separated from each other.

Therefore it is necessary to provide an improved dome part for overcoming the above-mentioned disadvantages.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
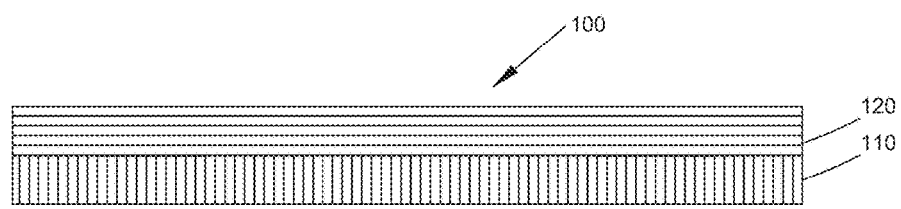
FIG. 1 is an illustration of a carbon fiber dome in accordance with an exemplary embodiment of the present disclosure.

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

In the prior art, the foam material and the aluminum foil are combined to make the dome. Since the foam material and the aluminum foil are different materials, the bonding between layers are not tight which will cause delamination. Different materials have different acoustic characteristics which will cause loss of acoustic performance.

The present disclosure discloses a dome made of carbon fibers to overcome the problems of domes in the prior art being liable to splintering, delamination and inadequate strength, poor appearance and large thickness. The aluminum foil and the foam material in the prior art are substituted with the carbon fiber material, making it is simple to make the dome and control the manufacturing process. Since the same one type of materials is used, the delamination due to use of different materials can be avoided. Besides, the combined carbon fiber materials can provide sufficient strength, meet users' needs and have a much smaller thickness than the combination of the foam material and the aluminum foil. Specifically, the embodiment of the present disclosure provides a carbon fiber dome which comprises at least two carbon fiber prepreg layers, wherein the at least two carbon fiber prepreg layers comprise two types of (nonwoven and woven) carbon fiber prepregs. In accordance with the present disclosure, at least two carbon fiber prepreg layers are combined to form a dome of the same material, guaranteeing the tight bonding between layers; the carbon fiber can bear a great force, guaranteeing the strength of the carbon fiber dome; and the prepreg resin in the prepregs is cured during the combination, thus further improving the strength and guarantees a clean, smooth and nice surface after the carbon fiber prepregs are combined. Further, in accordance with the present disclosure, the two types of (nonwoven and woven) carbon fiber prepregs are adopted for the at least two carbon fiber prepreg layers, which can avoid the problems caused by adoption of a single type. For example, uni-directional carbon fiber prepreg tapes are used for the at least two layers. In this case, the carbon fiber filaments are weakly connected, so they will separate from each other after use for a long time. If only a single type of carbon fiber fabric (woven prepregs), i.e. bi-directional tapes, the capacity for bearing the external force is weakened and the thickness is increased. In the embodiment of the present disclosure, two types of carbon fiber prepregs are adopted, making the product not easily break while guaranteeing a high strength.

In the present disclosure, the carbon fiber material is adopted to make the dome. This material has a great specific strength, which can decrease the thickness of the dome while keeping the strength unchanged; the material is resistant to crushing, so it can be moulded integrally together with the membrane; and the material is solid and does not absorb water, providing good waterproofness. The layers of carbon fiber are well bonded and not easily separated.

Specifically, referring to FIG. 1, the carbon fiber dome 100 in accordance with an exemplary embodiment of the present disclosure comprises a first carbon-fiber layer 110 and a second carbon-fiber layer 120 over the first carbon-fiber layer 110, wherein both the first carbon-fiber layer 110 and the second carbon-fiber layer 120 contains carbon fiber prepregs, and fiber filament of the carbon fiber prepregs in the first carbon-fiber layer 110 have different direction from fiber filament of the carbon fiber prepregs in the second carbon-fiber layer 120, for example, uni-directional prepreg tapes are used for the carbon fiber prepregs in the first carbon-fiber layer 110, and the prepreg fabrics are used for the carbon fiber prepregs in the second carbon-fiber layer 120, i.e. bi-directional prepreg tapes, or vice verse. The prepreg resin in the first carbon-fiber layer 110 and the prepreg resin in the second carbon-fiber layer 120 are cured to form a composite layer through treatment at a high temperature and under a high pressure, guaranteeing the strength and abrasion resistance of the materials, not liability to breakage and guaranteeing the service life.

Figure 2:
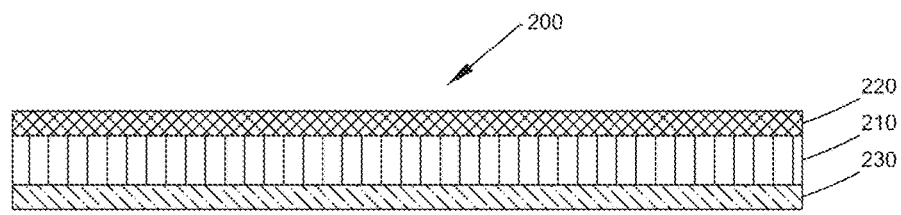
FIG. 2 is an illustration of a carbon fiber dome with a three-layer configuration.
Figure 3:
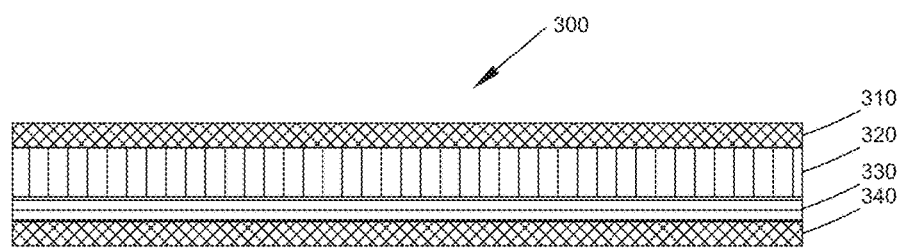
FIG. 3 is an illustration of a carbon fiber dome with a four-layer configuration.

The carbon fiber dome in the embodiment of the present disclosure may comprise two carbon fiber layers, or more than two carbon fiber layers, as three carbon fiber layers, four carbon fiber layers, five carbon fiber layers or more carbon fiber layers, but it is very important that at least two types of carbon fiber prepregs are used for the carbon fiber prepregs in the multiple carbon fiber layers. Except the uni-directional tape and the bi-directional tape mentioned above, three-directional tape may also be used, i.e. the angle between the fiber filaments are 60 degrees and can be set based on the requirements of products. In the carbon fiber dome of the embodiment of the present disclosure, multiple carbon fiber prepreg layers are combined, which can provide a good mechanical strength and smaller thickness. The thickness of the carbon fiber dome in the embodiment of the present disclosure is 40~250 um, guaranteeing both the strength and the convenience of manufacturing. In addition to the mechanical strength, the carbon fiber dome in the embodiment of the present disclosure can also provide a very high acoustic quality, because the dome made of the same material guarantees the purity of sound produced, especially when the thickness of the carbon fiber dome is 80~150 um, which guarantees very good frequency characteristics and cover a wider sound production range. FIG. 2 shows a dome with three carbon fiber layers combined, and FIG. 3 shows a dome with four carbon fiber layers combined; uni-directional carbon fiber prepreg tapes, carbon fiber prepreg fabrics (i.e. bi-directional prepreg tapes), and three-directional carbon fiber prepreg tapes can be adopted for the carbon fiber dome 200 in the figure, for example, carbon fiber prepreg fabrics 210 are used for the uppermost layer, three-directional carbon fiber prepreg tapes 220 are used for the middle layer, and uni-directional carbon fiber prepreg tapes 230 are used for the lowermost layer. The composite layer is one body, having a high strength and not liable to breakage. Uni-directional carbon fiber prepreg tapes and carbon fiber prepreg fabrics (i.e. bi-directional prepreg tapes) can be adopted for the carbon fiber dome 300 in the FIG. 3. The carbon fiber prepreg fabrics 310 are used for the uppermost layer, two layers of uni-directional carbon fiber prepreg tapes 320, 330 are used for the middle layer, and carbon fiber prepreg fabrics 340 are used for the lowermost layer, wherein the fiber direction in the middle two layers of uni-directional carbon fiber prepreg tapes 320, 330 are perpendicular to each other, guaranteeing balance stressing in various directions. The three layers are treated and combined at a high temperature and under a high pressure to form an integral structure, providing a high strength and not liable to breakage.

The carbon fiber dome in the embodiment of the present disclosure may comprise two carbon fiber layers, or more than two carbon fiber layers, as three carbon fiber layers, four carbon fiber layers, five carbon fiber layers or more carbon fiber layers, but it is very important that at least two weaving methods are used for the carbon fiber prepregs in the multiple carbon fiber layers. Except the uni-directional tape and the bi-directional tape mentioned above, three-directional tape may also be used, i.e. the angle between the fiber filaments are 60 degrees and can be set based on the requirements of products. In the carbon fiber dome of the embodiment of the present disclosure, multiple carbon fiber prepreg layers are combined, which can provide a good mechanical strength and smaller thickness. The thickness of the carbon fiber dome in the embodiment of the present disclosure is 40~250 um, guaranteeing both the strength and the convenience of manufacturing. In addition to the mechanical strength, the carbon fiber dome in the embodiment of the present disclosure can also provide a very high acoustic quality, because the dome made of the same material guarantees the purity of sound produced, especially when the thickness of the carbon fiber dome is 80~150 um, which guarantees very good frequency characteristics and cover a wider sound production range. FIG. 2 shows a dome with three carbon fiber layers combined, and FIG. 3 shows a dome with four carbon fiber layers combined; three weaving methods can be adopted for the carbon fiber dome 200 in the figure, for example, carbon fiber prepreg fabrics 210 are used for the uppermost layer, three-directional carbon fiber prepreg tapes 220 are used for the middle layer, and uni-directional carbon fiber prepreg tapes 230 are used for the lowermost layer. The composite layer is one body, having a high strength and not liable to breakage. Two weaving methods can be adopted for the carbon fiber dome 300 in the FIG. 3. The carbon fiber prepreg fabrics 310 are used for the uppermost layer, two layers of uni-directional carbon fiber prepreg tapes 320, 330 are used for the middle layer, and carbon fiber prepreg fabrics 340 are used for the lowermost layer, wherein the fiber direction in the middle two layers of uni-directional carbon fiber prepreg tapes 320, 330 are perpendicular to each other, guaranteeing balance stressing in various directions. The three layers are treated and combined at a high temperature and under a high pressure to form an integral structure, providing a high strength and not liable to breakage.

In the dome of the embodiment of the present disclosure, multiple layers of carbon fibers are used and the fiber direction of the layers are at an angle, guaranteeing the capacity of bearing forces at all directions. The included angle between layers are set to be 0 degree~90 degrees, such as those between adjacent layers are set to be 30 degrees, 45 degrees, 60 degrees, etc.

Figure 4:
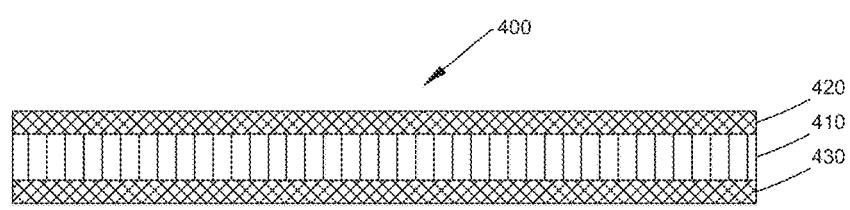
FIG. 4 is an illustration of a carbon fiber dome with a three-layer configuration in accordance with another exemplary embodiment.

As shown in the FIG. 4, the embodiment of the present disclosure discloses a carbon fiber dome 400 with three carbon fiber layers combined, comprising middle uni-directional carbon fiber prepreg tapes 410 and carbon fiber prepreg fabrics 420, 430 respectively applied on the sides thereof, wherein the thickness of the uni-directional carbon fiber prepreg tapes 410 is 60 um, and the thickness of both the carbon fiber prepreg fabrics 420, 430 is 20 um, thus guaranteeing the strength of the 60 um uni-directional tapes and not liable to breakage for the existence of carbon fiber fabrics. The carbon fiber layers in the carbon fiber dome in the embodiment of the present disclosure may have the same thickness or different thickness, and the thickness ration of adjacent layers may be set to be 1:20~1:1.

The carbon fiber prepregs in the present disclosure comprise a carbon fiber material and a prepreg resin, the carbon fiber prepregs can bear a great force in the direction of fiber extension, i.e. the fiber direction, but bear a lower force in the direction perpendicular to the fiber direction. However, the curing with the resin significantly improves its capacity of bearing the force. Specifically, the prepreg resin comprises, one or more of epoxy resin, poly(ether-ether-ketone) (PEEK), polyimide (PI), polyphenylene sulfide (PPS), poly (p-phenylenebenzobisoxazole) (PBO), poly-p-phenylene terephalamide (Aramid fiber 1414); the tensile modulus of the carbon fiber material is greater than 200 Gpa, and the carbon fiber material is the amorphous graphite material obtained by the process that organic fibers including flake graphite crystallite are packed along the axial direction of the fiber and then carbonized and graphitized. The carbon fiber is apparently flexible and intrinsically rigid, and lighter than the aluminum, and it has a greater strength than the steel iron, and possesses the characteristics of corrosion resistance and high modulus. In practice, above T300 of the T series and all models of the M series and other series with the same strength class produced by TORAY as well as the materials of other suppliers can be used. In this way, the mechanical characteristics of the dome of the present disclosure is substantially enhanced, while both the weight and the thickness are reduced. It should be noted that the T series and the M series of TORAY are the models of the Japan TORAY's carbon fibers and belong to the industrial standards, so those skilled in the field are readily accessible to both series of materials.

In manufacturing, it is enough to only bond the carbon fiber prepregs to each other. The bonding can be realized without use of any extra adhesive thanks to the stickiness of the carbon fiber prepregs. Following the bonding, the assembly is treated at a high temperature and under a high pressure in such a way that the prepreg resin in the carbon fiber prepregs is cured, further enhancing the strength of the bonding and therefore providing a more tighter bonding, further increasing the strength of the unidirectional carbon fiber prepreg tapes, guaranteeing the stressing strength of the dome and improving the high frequency performance of the dome by virtue of the cured resin. Meanwhile, the use of carbon fiber reduces the overall thickness of the dome, provides good vibrating performance, guarantees the sound quality and allows products to occupy less space. In addition, the curing of the resin in the carbon fiber prepreg tapes gives a smooth surface of the dome, and the hard resin after the curing is not easily scratched, making the carbon fiber dome 100 more attractive.

Figure 5:
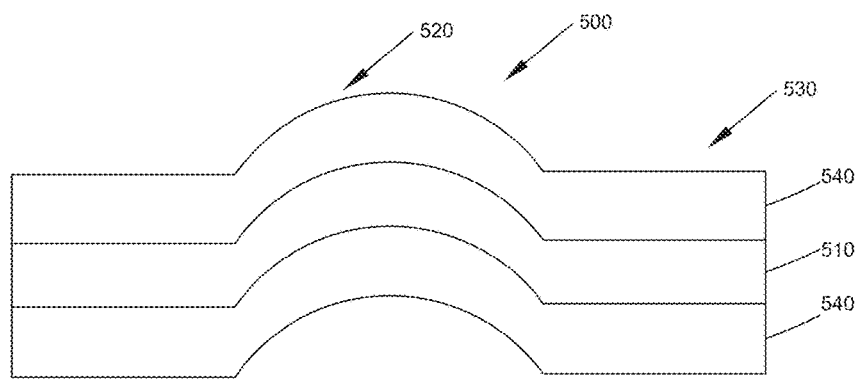
FIG. 5 is an illustration of a carbon fiber dome in accordance with another exemplary embodiment.

The dome in the present disclosure may be plate-shaped or have a hemispherical structure. Specifically, the carbon fiber dome can also be designed as a hemispherical structure to further improve the high frequency performance. As shown in the FIG. 5, some embodiments of the present disclosure disclose a carbon fiber dome 500 which comprises a foam material layer 510 and uni-directional carbon fiber prepreg tapes 540 on both sides of the foam material layer 510, wherein the uni-directional carbon fiber prepreg tapes 510 and the foam material layer are made into the dome through treatment at a high temperature and under a high pressure. The dome comprises a convex hull-shaped structure 520 and a plate-shaped structure 530, wherein the plate-shaped structure is provided around the convex hull-shaped structure.

Once the carbon fiber dome of the present disclosure is formed, it is cut into a desired shape by such technologies as the laser cutting, cutting by a trimming die and die-cutting by a die-cutting machine, bonded with the membrane by application of gum, gluing and other methods to form a vibration assembly, and assembled into a loudspeaker at last.

Figure 6:
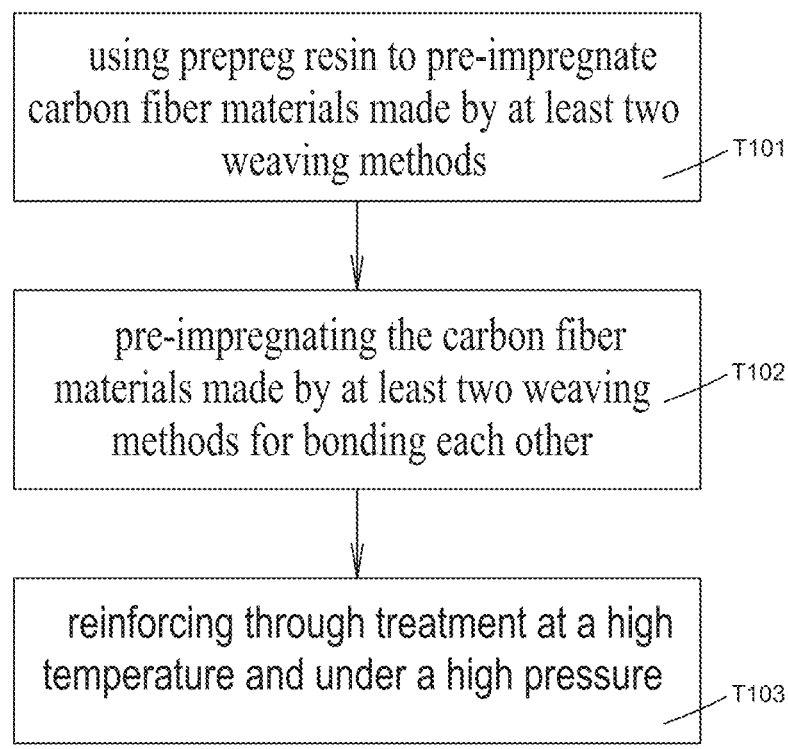
FIG. 6 is a flow chart of a manufacturing method for making the carbon fiber dome of the present disclosure.

In accordance with the other aspect of the present disclosure, a manufacturing method is disclosed to manufacture a carbon fiber dome with both a fine appearance and excellent mechanical and acoustic performance. The manufacturing method features a reliable and simple process, and the dome made by the method has an excellent performance. Specifically, as shown in the FIG. 6, the embodiment of the present disclosure discloses a manufacturing method of the carbon fiber dome, which includes the following steps: T101, a prepreg resin is used to pre-impregnate carbon fiber materials to form carbon fiber prepregs, the carbon fiber materials comprises nonwoven prepregs and woven prepregs; T102, pre-impregnated carbon fibers are attached to each other without use of any extra adhesive thanks to the stickiness of the pre-impregnated carbon fiber materials, so the operation is simple; and T103, the assembly is treated at a high temperature and under a high pressure to bond the carbon fiber materials tightly to each other, featuring a reliable and simple process. The prepreg resin comprises one or more of epoxy resin, poly(ether-ether-ketone) (PEEK), polyimide (PI), polyphenylene sulfide (PPS), poly (p-phenylenebenzobisoxazole) (PBO) and poly-p-phenylene terephthamide (Aramid fiber 1414).

In accordance with the manufacturing method of the dome in the present disclosure, a composite layer can be formed by simply sticking, and then reinforced through treatment at a high temperature and under a high pressure to obtain the dome with excellent mechanical and acoustic performance while having a fine appearance. The manufacturing method in the embodiment is simple and easy to operate and has a low requirement for the equipment, so it enjoys a prospect of a wide application.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A carbon fiber dome, comprising:
   at least three carbon fiber prepreg layers;
   wherein
   the at least three carbon fiber prepreg layers comprise at least three kinds of carbon fiber prepregs, the three kinds of carbon fiber prepregs comprise uni-directional carbon fiber prepreg tapes and carbon fiber prepreg fabrics and three-directional carbon fiber prepreg tapes;
   the carbon fiber dome comprises three carbon fiber layers, with carbon fiber prepreg fabrics used for the uppermost layer, three-directional carbon fiber prepreg tapes used for the middle layer, and uni-directional carbon fiber prepreg tapes used for the lowermost layer.

2. The carbon fiber dome as described in claim 1, wherein a thickness of the carbon fiber dome is 40~250 μm.

3. The carbon fiber dome as described in claim 2, wherein the thickness of the carbon fiber dome is 80~150 μm.

4. The carbon fiber dome as described in claim 1, wherein an included angle range of the fibers of the carbon fiber prepreg in adjacent layers is 0 degree 90 degrees.

5. The carbon fiber dome as described in claim 1, wherein a thickness ratio range of the carbon fiber prepregs in adjacent layers is 1:20~1:1.

6. The carbon fiber dome as described in claim 1, wherein the carbon fiber prepregs comprise a carbon fiber material and a prepreg resin, and the tensile modulus of the carbon fiber material is greater than 200 Gpa.

7. The carbon fiber dome as described in claim 6, wherein the prepreg resin comprises one or more of poly (p-phenylenebenzobisoxazole) and poly-p-phenylene terephalamide.

8. The carbon fiber dome as described in claim 1, wherein a thickness of the uni-directional carbon fiber prepreg tapes is 60 μm, and a thickness of the carbon fiber prepreg fabrics is 20 μm.

9. A method for manufacturing the carbon fiber dome as described in claim 1, including the following steps:
   using prepreg resin to pre-impregnate carbon fiber materials;
   pre-impregnating the carbon fiber materials for bonding each other.

10. The carbon fiber dome as described in claim 1, wherein the angle between the fiber filaments in the three-directional carbon fiber prepreg tapes is 60 degrees.

* * * * *